March 15, 1960
E. TROST
2,928,483
CULTIVATING TOOL
Filed July 21, 1958
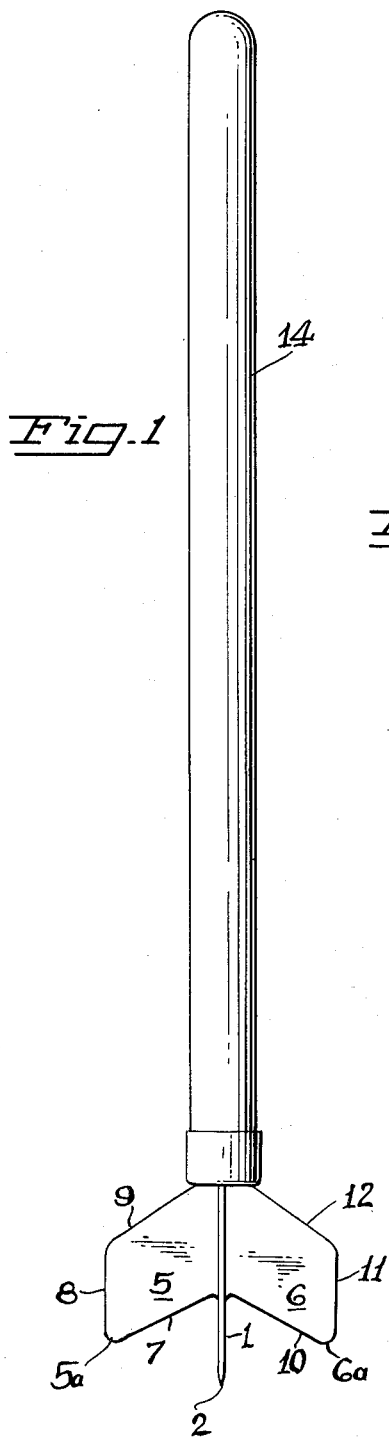
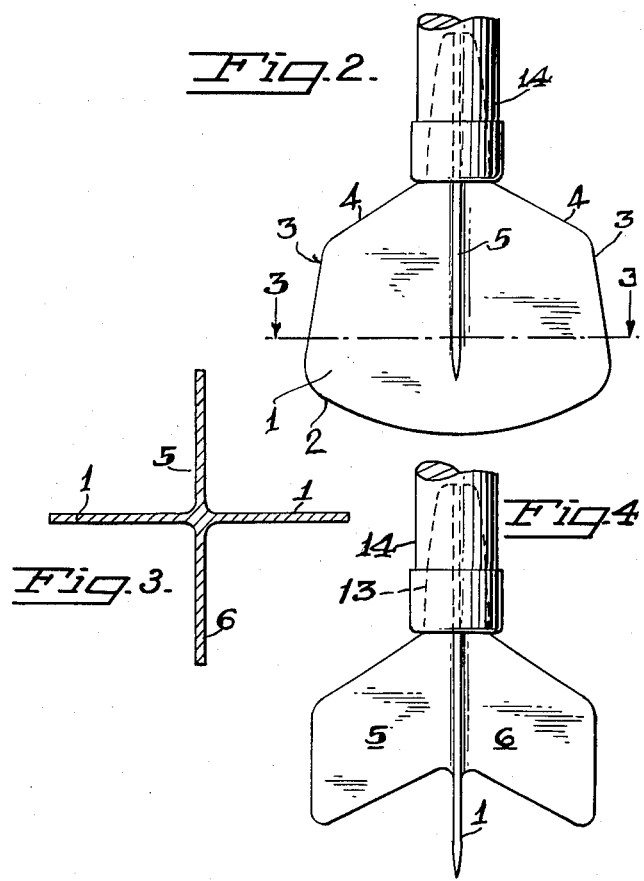
INVENTOR.
EUGEN TROST
BY J. E. Trabucco
ATTORNEY

United States Patent Office 2,928,483
Patented Mar. 15, 1960

2,928,483

CULTIVATING TOOL

Eugen Trost, San Mateo, Calif.

Application July 21, 1958, Serial No. 749,666

1 Claim. (Cl. 172—378)

This invention relates to an improved cultivating tool for use by gardeners.

The present invention provides a multiple blade garden tool for loosening and breaking up the soil in gardens and fields. The tool comprises a plurality of blades arranged at substantially right angles to one another, such blades being adapted to be manually projected into the ground and thereafter rotated by means of an elongated handle. The blades are so shaped and arranged with respect to one another that the soil may be easily penetrated when the tool is projected downwardly by means of the handle, thereupon enabling the gardener using the tool to turn the handle and cause the rotation of the blades while they are still imbedded in the soil.

The primary object of my invention is to provide a novel garden tool for use in cultivating and breaking up the soil in gardens and fields, such tool having a plurality of blades arranged at substantially right angles to one another.

Another object of my invention is to provide a novel garden tool of the kind characterized, one in which the blades are so arranged and shaped that the soil is penetrated at different depths, thereby making it possible when the tool is manually turned while imbedded in the soil to apply different and multiple pressures upon the soil engaged by the blades, to the end that the soil pulverizing action may be more effective without undue effort.

Other and further objects of my invention will be pointed out hereinafter or will be indicated in the appended claim or will be obvious to one skilled in the art upon an understanding of the present disclosure. For the purpose of this application, I have elected to show herein certain forms and details of a cultivating tool representative of my invention; it is to be understood, however, that the embodiment of my invention herein shown and described is for purposes of illustration only, and therefore it is not to be regarded as exhaustive of the variations of the invention in the art.

In the accompanying drawing:

Fig. 1 is a side elevation of a cultivating tool embodying my invention;

Fig. 2 is a similar view on an enlarged scale, showing the tool as it appears when viewed at right angles to the Fig. 1 view;

Fig. 3 is a sectional view taken on the line 3—3 of Fig. 2;

Fig. 4 is a side view, on an enlarged scale, corresponding to Fig. 1, showing by the broken lines the shank of the tool projected into the end of the handle; and Fig. 5 is a side elevation of a tool embodying another form my invention may assume.

Referring to the drawing, the numeral 1 designates a large flat blade having an arcuate lower edge 2, slightly inclined or vertical side edges, 3, 3, and inwardly inclined upper edges 4, 4. Secured centrally to the blade 1 at their inner ends and arranged at right angles thereto are two (2) smaller blades 5 and 6 which are arranged and shaped so as to provide a blade structure having the general shape of an inverted chevron. The blade 5 has a lower inwardly and upwardly inclined edge 7, a substantially vertical lateral edge 8 and an upper inwardly and upwardly inclined edge 9, the upper and lower edges being arranged in substantially parallel relationship. The blade 6 is similarly shaped, and it has a lower inwardly and upwardly inclined edge 10, a substantially vertical lateral edge 11 and an upper inwardly inclined edge 12, the lower and upper edges being arranged in substantially parallel relationship. The area of the large blade is substantially greater than the combined areas of the smaller blades 5 and 6.

The blades all preferably have sharp lower edges so they may more easily penetrate and cut into the soil when the tool is projected downwardly. The lower edge 2 of the large blade 1 extends considerably below the small blades 5 and 6, thereby making it possible for such large blade to penetrate the soil to a greater depth than the smaller blades each time the tool is projected downwardly. The smaller blades are secured at their inner ends to an axial upstanding stem or shank 13 which is also secured centrally to the larger blade, the said shank extending into and being secured to the lower end of a handle 14. The blades being positioned so the large blade 1 penetrates the soil to a greater depth than the smaller blades 5 and 6 enable the gardener using the tool to apply varied contra-forces to the soil engaged by the blades when the handle is manually rotated, thereby causing the soil to be effectively broken up with a minimum of effort. The smaller blades 5 and 6 have outer corner edges 5a and 6a, respectively, such corner edges being arranged to provide a wedge-like action that enables these blades to enter the soil easily and at the same time effectively break it up. The inclined lower edges 7 and 10 of the blades 5 and 6 being inclined inwardly toward each other facilitate the penetration of the tool into the soil. The lower edge 2 of the large blade 1 being arcuate in shape also enables the tool to penetrate the soil without undue resistance.

In the embodiment of my invention shown in Fig. 5, the tool is provided with two (2) large blades 15 and 16 of substantially the same shape, such blades being arranged at right angles to one another and each having a lower arcuate edge.

What I claim is:

In a cultivating tool, a first blade having an arcuate lower edge, and two similarly shaped second blades secured at their inner ends to the first blade and lying in a common plane and disposed at substantially right angles to the first blade, the second blades each being substantially smaller in area than the first blade, the second blades having inwardly and upwardly inclined converging lower edges, and the first and second blades being so constructed and arranged that the lower edge of the first blade is positioned substantially below the lower edges of the second blades, and an axial shank secured to the inner ends of the second blades and centrally to the first blade.

References Cited in the file of this patent

UNITED STATES PATENTS

| | | |
|---|---|---|
| 318,148 | Still | May 19, 1885 |
| 452,789 | Hutchinson | May 26, 1891 |
| 1,869,573 | McMeans | Aug. 2, 1932 |
| 1,896,568 | Ammons | Feb. 7, 1933 |
| 2,251,587 | Gagner | Aug. 5, 1941 |
| 2,299,378 | Cain | Oct. 20, 1942 |
| 2,628,647 | Rohmer | Feb. 17, 1953 |